(12) United States Patent
Yoong

(10) Patent No.: US 7,456,738 B2
(45) Date of Patent: Nov. 25, 2008

(54) TRANSPORT REFRIGERATION DOOR STATUS SENSING DEVICE

(75) Inventor: Koon-Chong Hammond Yoong, Singapore (SG)

(73) Assignee: Thermo King Corporation, Minneapolis, MN (US)

(*) Notice: Subject to any disclaimer, the term of this patent is extended or adjusted under 35 U.S.C. 154(b) by 275 days.

(21) Appl. No.: 11/443,229

(22) Filed: May 30, 2006

(65) Prior Publication Data

US 2006/0279424 A1    Dec. 14, 2006

Related U.S. Application Data

(60) Provisional application No. 60/686,385, filed on Jun. 1, 2005.

(51) Int. Cl.
*G08B 13/08* (2006.01)
*G08B 3/00* (2006.01)
*G08B 15/00* (2006.01)

(52) U.S. Cl. .............. 340/545.6; 340/686.1; 116/12

(58) Field of Classification Search ........ 340/545.6, 340/500–505, 524, 686.1; 116/12, 85, 86
See application file for complete search history.

(56) References Cited

U.S. PATENT DOCUMENTS

| | | | | |
|---|---|---|---|---|
| 4,359,646 | A * | 11/1982 | Mejia et al. | 307/116 |
| 4,812,810 | A * | 3/1989 | Query et al. | 340/545.3 |
| 5,936,522 | A * | 8/1999 | Vogt | 340/545.1 |
| 6,310,549 | B1 * | 10/2001 | Loftin et al. | 340/547 |
| RE37,467 | E * | 12/2001 | Brasch et al. | 340/541 |
| 6,924,734 | B2 * | 8/2005 | Nagasaka et al. | 340/426.15 |
| 2002/0196155 | A1 * | 12/2002 | McNulty, Jr. | 340/686.1 |
| 2004/0189460 | A1 * | 9/2004 | Heaton et al. | 340/500 |

* cited by examiner

*Primary Examiner*—George A Bugg
*Assistant Examiner*—Jennifer Mehmood
(74) *Attorney, Agent, or Firm*—Michael Best & Friedric LLP

(57) ABSTRACT

A door status sensing device for a transport container including a door. The door status sensing device includes an emitter attached to the container that transmits a first wireless signal in a first direction toward the door. A reflector attaches to the door and is aligned with the emitter to receive the first wireless signal, and generates a second wireless signal in a second direction opposite the first direction in response to the first wireless signal. The sensing device further includes a receiver attached to the container adjacent the emitter and opposite the reflector. The receiver is substantially aligned with the reflector, receives the second wireless signal, and generates a third signal indicative of the condition of the door condition in response to receipt of the second wireless signal. A controller selectively generates an alarm in response to the third signal indicative of the condition of the door.

13 Claims, 4 Drawing Sheets

TRANSPORT REFRIGERATION DOOR STATUS SENSING DEVICE

CROSS REFERENCE TO RELATED APPLICATIONS

This patent application claims priority to U.S. Provisional Application No. 60/686,385, filed on Jun. 1, 2005, the entire contents of which are incorporated by reference herein.

BACKGROUND

The present invention relates to a door status sensing device for a shipping or transport container, and more specifically, to a door status sensing device to monitor opened and closed positions of doors disposed in the container.

Existing transport containers that monitor door positions use extensive and complicated wire-based mechanical systems to determine door opened and closed positions. In these traditional mechanical door status sensing systems, the wires extend the entire length of the container. The long wires make the system more susceptible to failure, are often difficult to effectively replace, and create a need for higher electrical power to properly operate the system. The long wires can be subject to damage or interference, and add cost and reduce effectiveness of these systems. The long wires make the refrigeration system more susceptible to failure, potentially ruining temperature sensitive goods. In some instances, shipment of goods in containers that have long wires is avoided for these reasons.

These transport containers typically use mechanical door position sensing systems that wear out due to repeated operation. Worn mechanical door position sensors fail to indicate when a door is opened inappropriately. Over time, these systems become less reliable and the possibility of goods that are stolen or spoiled significantly increases.

SUMMARY

In one embodiment the invention provides a door status sensing device for a transport container that includes a door and a transport refrigeration system having climate control apparatus. The sensing device includes an emitter attached to the container that transmits a first wireless signal in a first direction toward the door. A reflector couples to the door and substantially aligns with the emitter. The reflector receives the first wireless signal and generates a second wireless signal in a second direction substantially opposite the first direction in response to the first wireless signal. The sensing device further includes a receiver attached to the container adjacent the emitter and opposite the reflector. The receiver substantially aligns with the reflector and receives the second wireless signal. The receiver generates a third signal indicative of the condition of the door in response to receipt of the second wireless signal. A controller is in electrical communication with the receiver to selectively generate an alarm in response to the third signal indicative of the condition of the door.

In another embodiment the invention provides a sensing device for a transport container that includes a first door, a second door, and a transport refrigeration system having climate control apparatus. The sensing device includes an emitter attached to the container that transmits a first wireless signal in a first direction toward the first door. A reflector couples to the first door and substantially aligns with the emitter. The reflector receives the first wireless signal and generates a second wireless signal in a second direction substantially opposite the first direction in response to the first wireless signal. A receiver attaches to the container adjacent the emitter and opposite the reflector, and substantially aligns with the reflector to receive the second wireless signal. The receiver generates a third signal indicative of the first door condition in response to receipt of the second wireless signal. A switch couples to the second door and generates a fourth signal indicative of a second door condition. A controller is in electrical communication with the receiver and the switch. The controller selectively generates a first alarm in response to the third signal indicative of the first door condition and selectively generates a second alarm in response to the fourth signal indicative of the second door condition.

In yet another embodiment the invention provides a method of detecting a condition of a door for a transport container. The method includes transmitting a first wireless signal in a first direction toward the door with an emitter, aligning a reflector with the emitter and sensing the first wireless signal with the reflector, and generating a second wireless signal in a second direction substantially opposite the first direction with the reflector in response to the first wireless signal. The method also includes aligning a receiver with the reflector and sensing the second wireless signal with the receiver, generating a third signal indicative of a condition of the door in response to the second wireless signal, and sensing the third signal indicative of the condition of the door with a controller and selectively generating an alarm indicative of the condition of the door.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
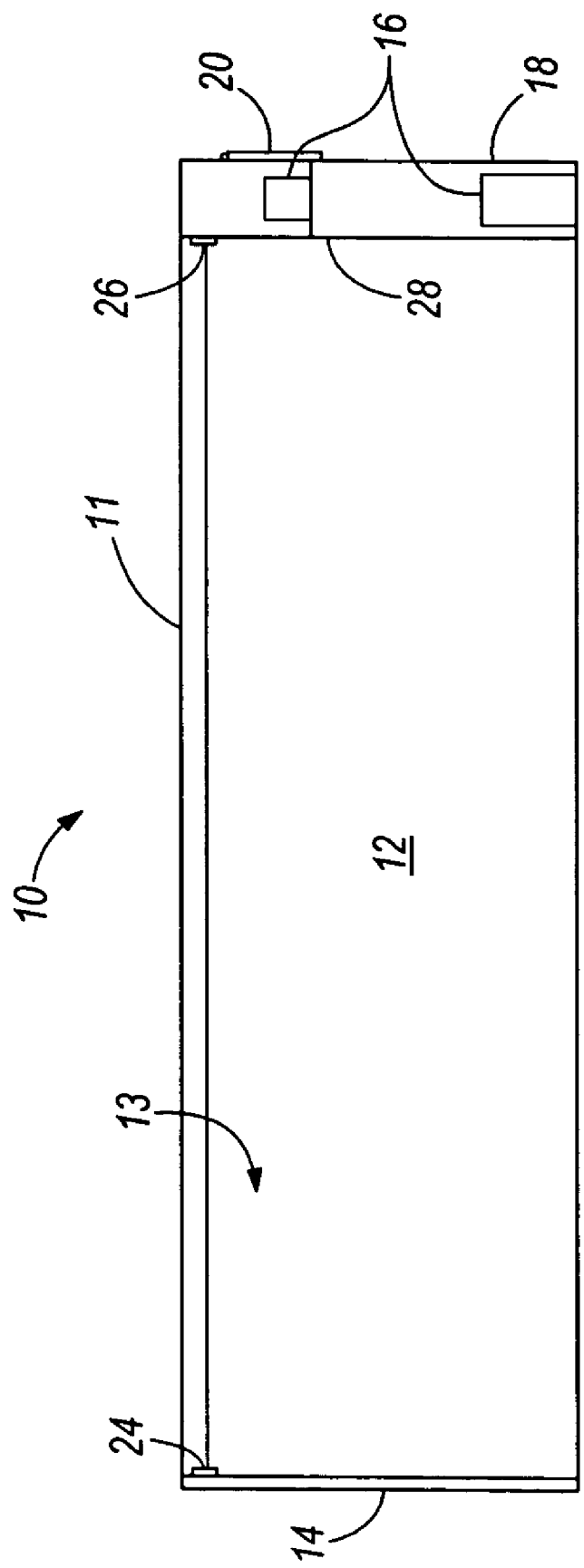
FIG. 1 is a side view of a shipping container with a side wall removed.

FIG. 1 shows a transport container 10 that includes a top wall 11 and side walls 12 that partially define a space 13 that supports storage of products and goods. One of the side walls 12 shown in FIG. 1 has been removed to expose the space 13.

The top wall 11 and the side walls 12 may include insulation to maintain the space 13 at predetermined conditions (e.g., temperature, humidity, etc.) that are different from ambient conditions.

A rear door 14 allows access to the space 13 from a first end of the container 10. The rear door 14 extends over a substantial portion of the first end of the container 10 and opens to allow bulk items and goods to be stored in the space 13 and to permit removal of goods from the space 13. The rear door 14 is closed to maintain the goods at the predetermined conditions during transport and storage of the container 10.

Figure 2:
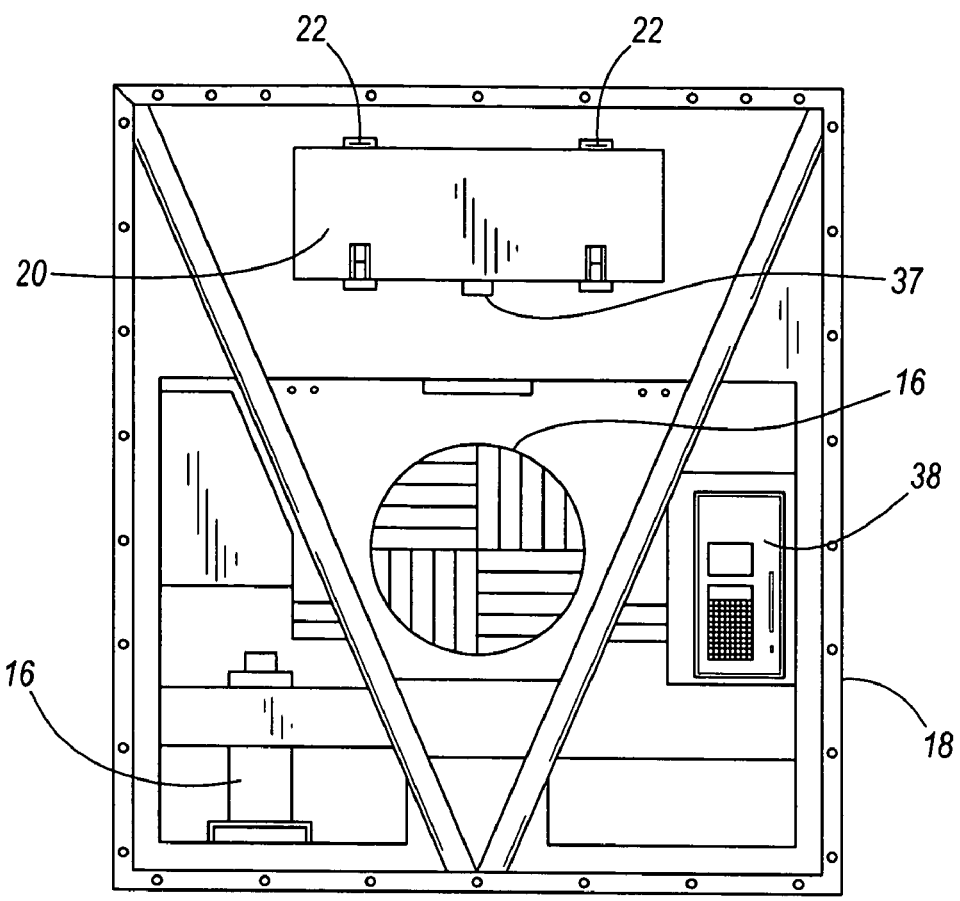
FIG. 2 is a front view of the container of FIG. 1.

The container 10 further includes a transport refrigeration system having climate control apparatus 16, a container panel 18, and an access door 20. The climate control apparatus 16 is at least partially enclosed by the container panel 18 that is disposed on a second end of the container 10. The climate control apparatus 16 includes refrigeration components (not shown), such as an evaporator, a condenser, and a compressor to vary at least one condition of the space 13. As illustrated in FIGS. 1 and 2, the access door 20 is disposed adjacent an upper portion of the container panel 18 and pivotally couples to the container panel 18 with conventional hinges or pins 22. The access door 20 can be opened to provide access to a portion of the climate control apparatus 16, such as the evaporator or the compressor. The evaporator is a critical component that requires convenient access and therefore the access door 20 is relatively large.

FIG. 1 shows a reflector 24 attached to the rear door 14 within the space 13 and directed toward a sensor 26 coupled to the container opposite the reflector 24. The reflector 24 is substantially aligned with the sensor 26 to allow communication between the reflector 24 and the sensor 26. The reflector 24 may include reflective material to reflect an incoming signal. In other embodiments, the reflector 24 may be coupled to the access door 20 and the sensor 26 may be attached to the container 10 opposite the reflector 24 on the access door 20.

Figure 3:
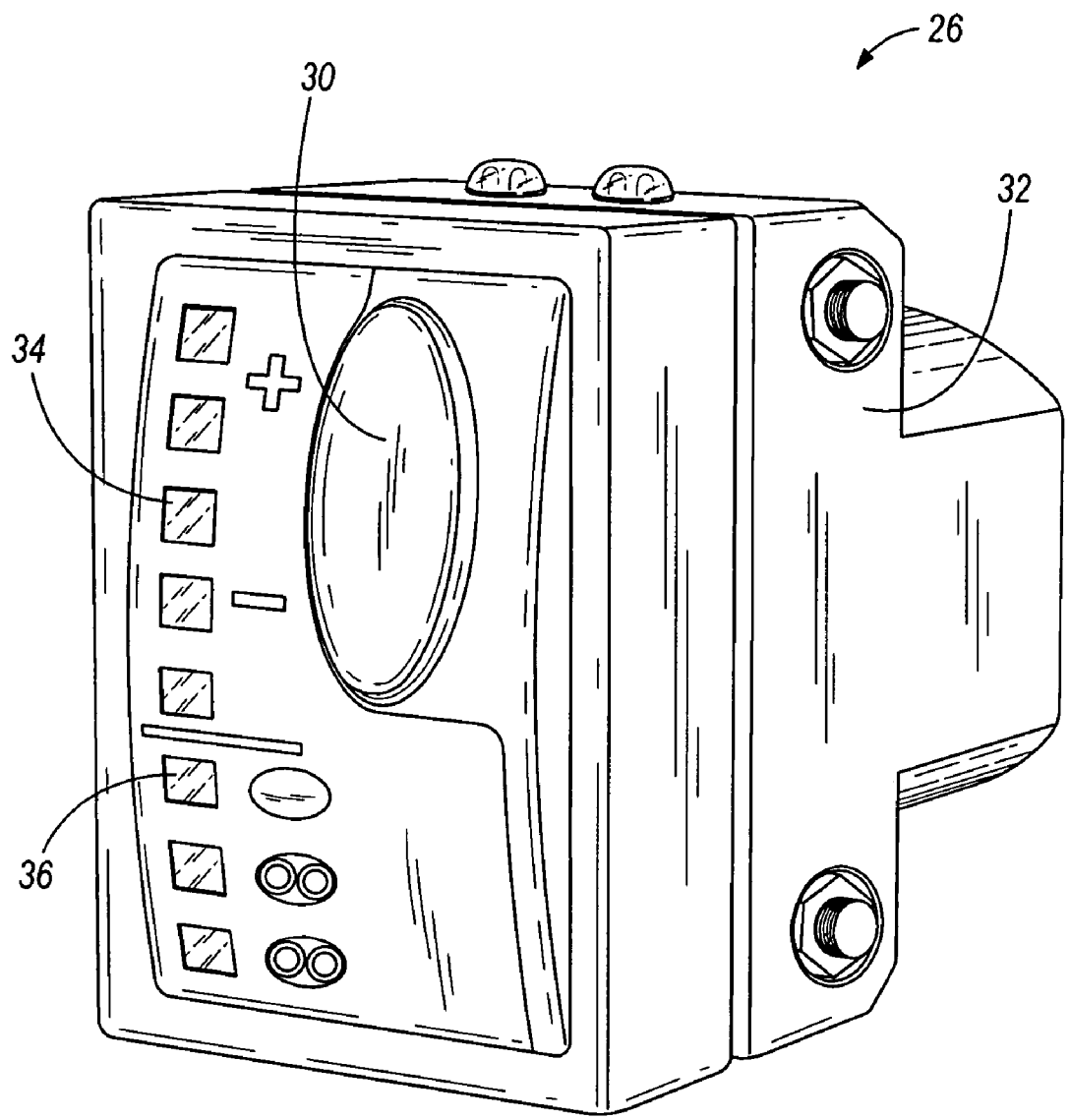
FIG. 3 is a perspective view of a sensor of the container of FIG. 1.

The sensor 26 is attached to an interior panel 28 of the container 10 adjacent the climate control apparatus 16, and is directed at the reflector 24 within the space 13 to detect an open condition and a closed condition of the rear door 14. As shown in FIG. 3, the sensor 26 includes a pushbutton 30 and a housing 32 that encloses an emitter 34 and a receiver 36. The pushbutton 30 is disposed on a front of the housing 32 to facilitate programming of the sensor 26. In some embodiments, the pushbutton 30 may turn the sensor 26 "on" and "off." One embodiment of the sensor 26 is sold by Banner Engineering, having its principle place of business in Minneapolis, Minn. An appropriate Banner Engineering laser sensor is the World-Beam Model QS-30L, which is a mid-size universal laser sensor that allows simple alignment of a laser beam and provides long-range sensing capability. In other arrangements, other types of sensors can be utilized to sense a position of the rear door 14 and/or the access door 20.

The emitter 34 emits a first wireless signal or light signal (e.g., polarized laser beam, etc.) in a first direction toward the reflector 24. The reflector 24 generates a second wireless signal in a second direction toward the receiver 36 in response to the first wireless signal. In some embodiments, the reflector 24 reflects the first wireless signal according to an angle of incidence (i.e., between 0 degrees and 90 degrees) of the incoming signal on the reflector 24 to generate the second wireless signal. The receiver 36 detects the presence of the second wireless signal. Lack of detection of the second wireless signal by the receiver 36 may indicate that the first wireless signal was received by the reflector 24 and that the second wireless signal may have been directed in a direction that is different from the second direction. Alternatively, lack of detection of the second wireless signal may indicate that the first wireless signal was not received by the reflector 24.

In embodiments that include the reflector 24 positioned on the rear door 14, detection of the second wireless signal by the receiver 36 indicates the closed condition of the rear door 14. Lack of detection of the second wireless signal by the receiver 36 indicates the open condition of the rear door 14. In embodiments that include the reflector 24 positioned on the access door 20, detection of the second wireless signal by the receiver 36 indicates the closed condition of the access door 20. Lack of detection of the second wireless signal by the receiver 36 indicates the open condition of the access door 20. The sensor 26 generates a third signal indicative of the open or closed condition of the rear door 14 and/or the access door 20 based on the detection of the second wireless signal by the receiver 36.

FIG. 2 shows a switch 37 positioned adjacent the access door 20 to sense the open and closed condition of the access door 20. The switch 37 includes a housing 48 having a sensor (not shown), and is coupled adjacent the access door 20 using one or more fasteners 50. The sensor detects a condition of the access door 20 and generates a signal indicative of the open and closed conditions. A connector 52 is attached to the housing 48 and provides electrical communication between the switch 37 and a controller 38 to communicate the signal to the controller 38 and to provide power to the switch 37. When the access door 20 is at least partially opened, the switch 37 is configured to generate the signal indicative of the open condition of the access door 20.

Figure 4:
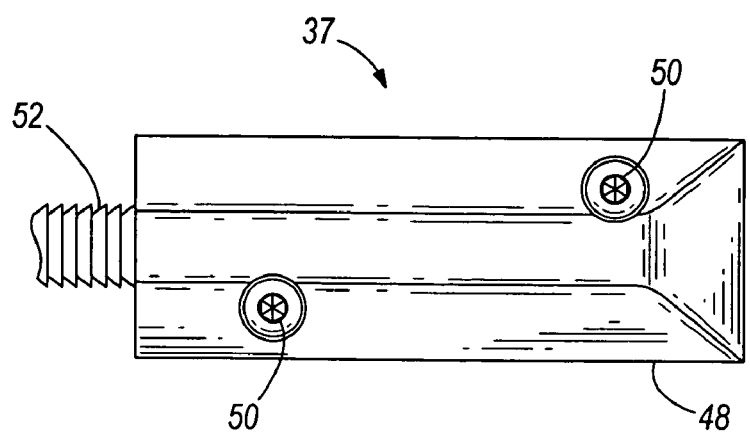
FIG. 4 is a top view of a switch of the container of FIG. 1.

As shown in FIG. 4, the switch 37 includes a magnetic reed switch that is well known to those skilled in the art. The magnetic reed switch is a non-mechanical switch that includes two or more metal reeds (not shown) having contacts disposed on the ends of the reeds. Reed switches are actuated by a magnetic field from an external magnet placed in close proximity. A magnet (not shown) is attached to the access door 20 to generate the magnetic field. This magnetic field causes the reeds to become magnetic, and the ends to be attracted to the magnetic field. The contacts either open or close in response to the presence of the magnetic field based on whether the contracts are normally open or normally closed. Removal of the magnetic field allows the reeds to restore the contacts to their original state. Typical specifications can be a switching voltage of 240 volts AC maximum, a switching current of 0.50 amperes maximum, a switching capacity of 10.0 volt amperes maximum, and a contact resistance of 100 milliohms maximum. The switch 37 may further include a switching distance of 8.0 millimeters.

The illustrated embodiment in FIG. 1 shows the reflector 24 and the sensor 26 disposed in the container 10 to sense the conditions of the rear door 14, and the switch 37 disposed in the container 10 to sense the conditions of the access door 20. However, other embodiments may include any combination of one or more reflectors 24, sensors 26 and switches 37 to sense conditions of the rear door 14, the access door 20, and other doors (not shown) of the container 10.

The controller 38 is disposed adjacent the container panel 18 and is in electrical communication with the climate control apparatus 16 to monitor the operational status of the apparatus 16. When at least a portion of the control apparatus 16 does not function properly or has malfunctioned, the controller 38 generates a first alarm indicative of the failure. The controller 38 is further in electrical communication with sensors (not shown) disposed within the space 13. The sensors within the space 13 are configured to generate one or more signals indicative of the conditions of the space 13. The controller 38 generates a second alarm in response to the conditions of the space 13 that are outside of a predetermined range. The controller 38 also engages the climate control apparatus 16 to control conditions of the space 13. In one embodiment, the controller 38 is programmed to receive the signals indicative of the conditions of the space 13 and to automatically engage the climate control apparatus 16 according to predetermined parameters. In another embodiment, the controller 38 is programmed to vary the conditions of the space 13 in response to input from an operator or system manager of the container 10.

The controller 38 is in electrical communication with the sensor 26 and the switch 37 to receive the signals indicative of the open and closed conditions of the rear door 14 and the access door 20, respectively. If the sensor 26 indicates that the rear door 14 is open and operating conditions of the container 10 require the rear door 14 closed, the controller 38 generates a third alarm indicative of the open condition of the rear door 14. If the switch 37 indicates that the access door 20 is open and operating conditions of the container 10 require the access door 20 closed, the controller 38 generates a fourth alarm indicative of the open condition of the access door 20. In some embodiments, the controller 38 displays the conditions of the rear door 14 and the access door 20, as well as the first, second, third, and fourth alarms. The operator can facilitate appropriate action regarding container operation in response to the displayed conditions and/or alarms.

In some embodiments, the controller 38 may include a database (not shown) to log the operational status of the climate control apparatus 16, the sensed conditions of the space 13, and the respective door conditions of the rear door 14 and the access door 20 in response to the signals received from the sensor 26 and/or the switch 37. The database can be accessed by the operator to verify that the container 10 is operating effectively and to facilitate maintenance. The logged status and conditions can be quite useful for the purpose of maintaining or establishing the integrity of goods transported within the container 10. In the illustrated embodiment, the controller 38 is a Thermo King Model MP3000 controller available from Thermo King Corporation, having its principal place of business in Minneapolis, Minn. In other arrangements, different controllers may be used to facilitate monitoring of the climate control apparatus, the sensed conditions of the space 13, and the respective positions of the rear door 14 and the access door 20.

Figure 5:
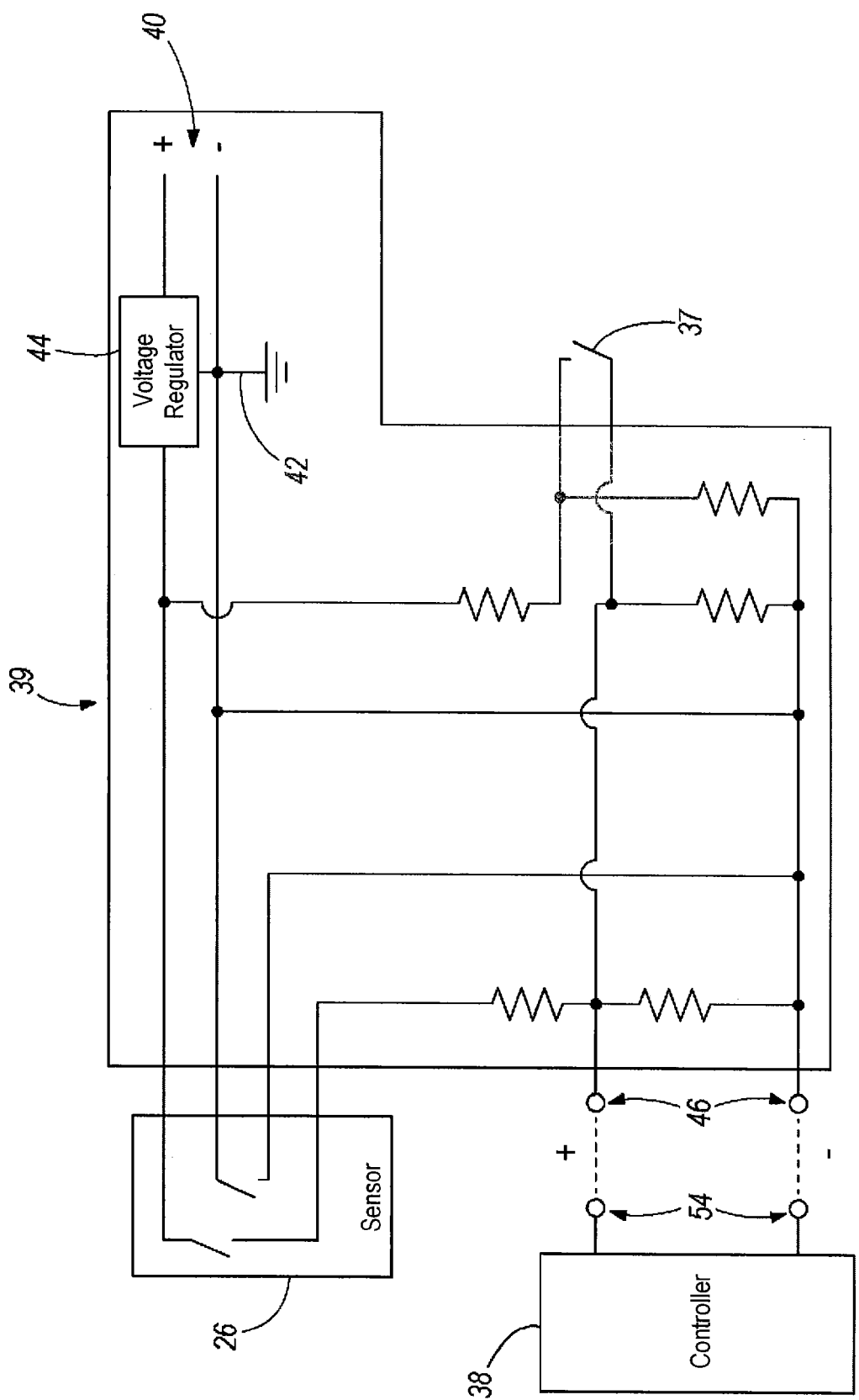
FIG. 5 is a circuit diagram of a door status sensing device of the container of FIG. 1.

Other embodiments of the container 10 may employ a separate control device or door status sensing device 39 to monitor the conditions of the rear door 14 and the access door 20. The sensing device 39 is illustrated in FIG. 5 as a circuit diagram. The sensing device 39 is electrically coupled with the sensor 26 to receive the signals indicative of the open and closed conditions of the rear door 14. The sensing device 39 is further electrically coupled with the switch 37 to receive one or more signals indicative of the open and closed conditions of the access door 20. The sensing device 39 includes a power supply 40, a ground 42, a voltage regulator 44, and a signal output 46. The power supply is a 12 volt DC power source, although other power sources may be used to supply power to the door status sensing device.

The signals indicative of the respective conditions of the rear door 14 and the access door 20 provided by at least one of the sensor 26 and the switch 37 are directed to the signal output 46. The signal output 46 couples with a spare input (not shown) of the controller 38. In one construction, the signal output 46 includes a two wire arrangement utilizing different voltage conditions. Through the signal output 46, the sensor device 39 detects and emits signals indicative of the open and closed conditions of the rear door 14 and the open and closed conditions of the access door 20. Each signal from the signal output 46 is received and stored by the controller 38, which in turn generates the appropriate alarm.

Thus, the invention provides, among other things, a transport container including a door status sensing device to indicate the position of a container rear door and an evaporator door. Various features and advantages of the invention are set forth in the following claims.

What is claimed is:

1. A door status sensing device for a transport container including a first door, a second door, and a transport refrigeration system having climate control apparatus, the sensing device comprising:

an emitter attached to the container and configured to transmit a first wireless signal in a first direction toward the first door;

a reflector coupled to the first door and substantially aligned with the emitter, the reflector configured to sense the first wireless signal and to generate a second wireless signal in a second direction substantially opposite the first direction in response to the first wireless signal;

a receiver attached to the container adjacent the emitter and opposite the reflector, the receiver substantially aligned with the reflector and configured to sense the second wireless signal and to generate a third signal indicative of the first door condition in response to receipt of the second wireless signal;

a switch coupled to the second door and configured to generate a fourth signal indicative of a second door condition; and a controller in electrical communication with the receiver and the switch, the controller configured to selectively generate a first alarm in response to the third signal indicative of the first door condition and to selectively generate a second alarm in response to the fourth signal indicative of the second door condition.

2. The door status sensing device of claim 1, wherein the reflector is configured to generate the second wireless signal in response to receipt of the first wireless signal.

3. The door status sensing device of claim 1, wherein the first door includes a first door open condition and a first door closed condition, and wherein the controller is configured to generate the first alarm in response to the third signal indicative of the first door open condition.

4. The door status sensing device of claim 3, wherein the reflector is configured to generate the second wireless signal in the second direction when the first door is in the first door closed condition.

5. The door status sensing device of claim 1, wherein the second door includes a second door open condition and a second door closed condition, and wherein the controller is configured to generate the second alarm in response to the fourth signal indicative of the second door open condition.

6. The door status sensing device of claim 1, wherein the receiver is configured to generate the third signal indicative of the door in the open condition when the second wireless signal has not been sensed.

7. The door status sensing device of claim 1, wherein the emitter and the receiver cooperate to define a sensor configured to transmit the first wireless signal and to sense the second wireless signal.

8. The door status sensing device of claim 7, wherein the sensor includes a laser sensor.

9. The door status sensing device of claim 1, wherein the reflector is configured to reflect the first wireless signal to generate the second wireless signal.

10. The door status sensing device of claim 1, wherein the first wireless signal is defined by a polarized laser beam and the second wireless signal is defined by a reflection of the polarized laser beam.

11. The door status sensing device of claim 1, wherein the controller includes a database to store the first door condition and the second door condition, and wherein the controller is configured to allow access to the first door condition and the second door condition.

12. The door status sensing device of claim 11, wherein the controller is configured to monitor the first door condition independent of the second door condition.

13. The door status sensing device of claim 12, wherein the switch includes a magnetic reed switch.

\* \* \* \* \*